United States Patent [19]

Nylund et al.

[11] Patent Number: 4,826,653
[45] Date of Patent: * May 2, 1989

[54] FUEL ASSEMBLY WITH A WATER FLOW SEPARATED FROM THE FUEL RODS

[75] Inventors: Olov Nylund; Bertil Schölin, both of Västerås, Sweden

[73] Assignee: AB ASEA ATOM, Västerås, Sweden

[*] Notice: The portion of the term of this patent subsequent to Dec. 2, 2003 has been disclaimed.

[21] Appl. No.: 82,927

[22] Filed: Aug. 7, 1987

Related U.S. Application Data

[63] Continuation of Ser. No. 295,984, Aug. 25, 1981, abandoned.

[30] Foreign Application Priority Data

Oct. 29, 1980 [SE] Sweden ............................ 8007593

[51] Int. Cl.$^4$ ........................................... G21C 3/32
[52] U.S. Cl. ................................. 376/444; 376/352
[58] Field of Search .............. 376/444, 352, 353, 372, 376/439, 449

[56] References Cited

U.S. PATENT DOCUMENTS

| 3,087,881 | 4/1963 | Treshow | 376/372 |
|---|---|---|---|
| 3,380,649 | 4/1968 | Roberts | 376/372 X |
| 3,390,052 | 6/1968 | McDaniels | 376/230 |
| 3,533,912 | 10/1970 | Dempsey | 376/230 |
| 3,625,820 | 12/1971 | Gluntz | 376/372 |
| 3,725,199 | 4/1973 | Notari et al. | 376/224 X |
| 3,861,999 | 1/1975 | Zmola et al. | 376/224 X |
| 3,879,259 | 4/1975 | Persson et al. | 376/362 X |
| 3,888,732 | 6/1975 | Berglund et al. | 376/352 |
| 4,348,355 | 9/1982 | Nylund | 376/267 X |
| 4,526,745 | 7/1985 | Nylund et al. | 376/444 |

FOREIGN PATENT DOCUMENTS

| 270010 | 4/1969 | Austria . | |
|---|---|---|---|
| 0027984 | 5/1981 | European Pat. Off. | 376/352 |
| 1023829 | 2/1958 | Fed. Rep. of Germany . | |
| 1202404 | 10/1965 | Fed. Rep. of Germany . | |
| 1911973 | 11/1969 | Fed. Rep. of Germany . | |
| 2219124 | 11/1972 | Fed. Rep. of Germany . | |
| 472093 | 6/1969 | Switzerland . | |

Primary Examiner—Deborah L. Kyle
Assistant Examiner—Daniel Wasil
Attorney, Agent, or Firm—Pollock, Vande Sande & Priddy

[57] ABSTRACT

A fuel assembly for a boiling water reactor is provided with at least one vertical channel for a by-pass flow through the fuel assembly. The channel is supplied with water through a vertical supply tube surrounded by the base of the assembly, the supply tube being arranged with its lower end in the vicinity of the lower end of the base.

15 Claims, 7 Drawing Sheets

FUEL ASSEMBLY WITH A WATER FLOW SEPARATED FROM THE FUEL RODS

This application is a continuation of application Ser. No. 295,984, filed Aug. 25, 1981, now abandoned.

TECHNICAL FIELD

The present invention relates to a fuel assembly with a lower lattice arrangement and a plurality of fuel rods supported by said arrangement, at least one fuel box which surrounds a corresponding group of fuel rods, a base with an inlet opening for reactor coolant and a circular downwardly-facing, substantially annular end surface, the fuel assembly having at least one vertical water channel for a water flow running along the fuel rods but being separated from said fuel rods.

DISCUSSION OF PRIOR ART

More particularly, the invention relates to a fuel assembly which is constructed in such a way that it is capable of being used, with advantage, in a boiling water reactor which is originally intended for fuel assemblies having no water channel of the kind mentioned above, without it being necessary to introduce any considerable change of the other components of the reactor. A problem, which will then be encountered, is to achieve the necessary by-pass flow through the central water channel(s) when the reactor power is reduced by reducing the circulating cooling flow. The problem cannot be solved by simply constructing the by-pass channel in question with greater hydraulic flow capacity, since this channel also must have a flow capacity which gives optimum water distribution at full reactor power. A fuel assembly according to the invention has the advantage of giving a sufficient by-pass flow at a greatly reduced reactor power and circulating cooling flow, without giving too great a by-pass flow at full power. The total water flow supplied to a fuel assembly is always subjected to a throttling at the inlet of the fuel assembly. In accordance with known theory, the energy losses appearing in connection with the throttling do not start to manifest themselves until at some distance downstream of the throttling opening, more particularly where the stream of water starts to widen out again.

DISCLOSURE OF THE INVENTION

The present invention is based on calculations showing that a by-pass flow through a vertical water channel in a fuel assembly, is reduced to a relatively small extent upon a substantial reduction of the circulating cooling flow, if the by-pass flow is supplied by the aid of a vertical supply tube, the lower end of which is below the level at which the throttled stream of water supplied to the fuel assembly has acquired an increased cross-section with only vertical stream lines.

According to the invention, there is provided a fuel assembly having a vertical center line and comprising a lower lattice device and a plurality of fuel rods supported by said lattice device, and at least one fuel box which surrounds a corresponding group of fuel rods, a sleeve-like base with an inlet opening for reactor coolant and a circular, downwardly-facing, substantially annular end surface, the fuel assembly having at least one vertical water channel for a water flow running along the fuel rods and being separated therefrom. A supply tube with a downwardly-facing inlet opening is arranged in said base for the supply of water to the at least one water channel, the inlet opening of the supply tube being located below a horizontal plane, the height of which above the lowermost point of any other fuel assembly portions is equal to the inner diameter of said annular end surface. The fuel assembly is intended to be arranged in a reactor core in a conventional manner, with four fuel assemblies in each core module, water gaps between adjacent assemblies, and a control rod of cruciform cross-section in each module. In addition to the water flow flowing along the fuel rods and in contact with these, the reactor core is traversed by a first by-pass flow, which is located at the above-mentioned gaps formed between the fuel assemblies, and by a second by-pass flow, which is located at a plurality of vertical water channels of the above-mentioned kind.

BRIEF DESCRIPTION OF DRAWINGS

In the following the invention will be described with reference to the accompanying schematic drawings, in which.

DESCRIPTION OF PREFERRED EMBODIMENTS

Figure 1:
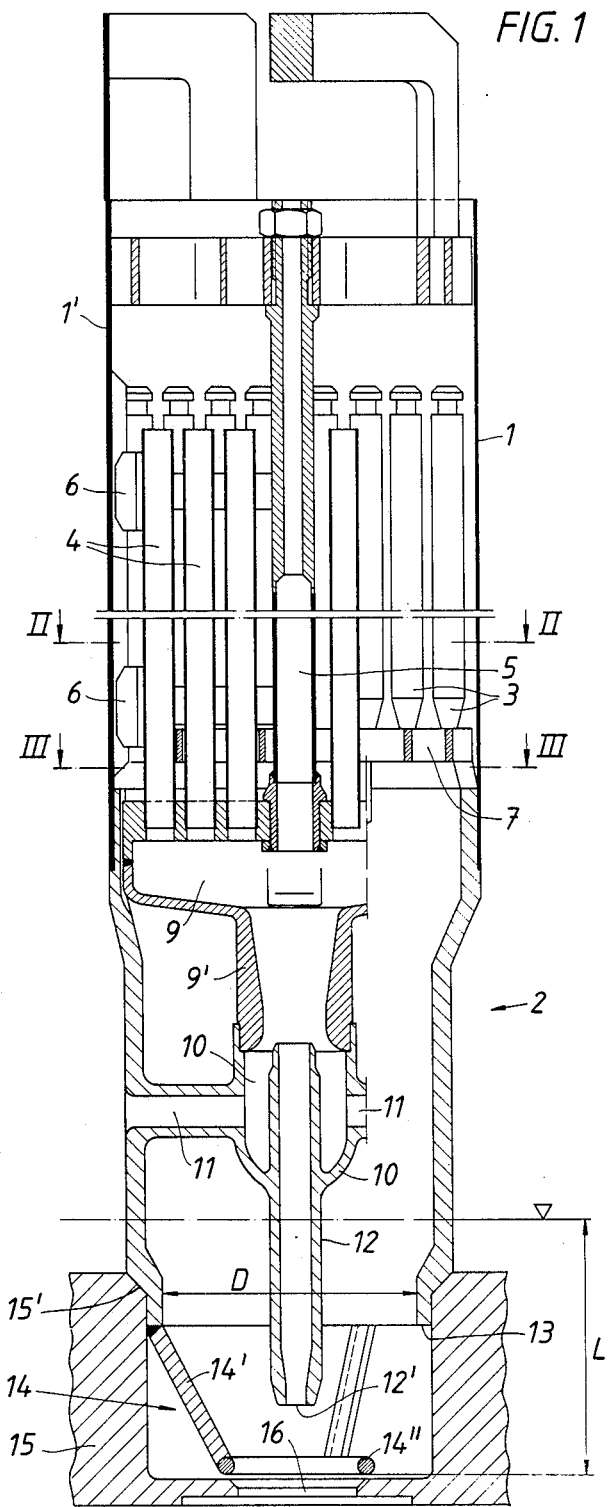
FIGS. 1, 2, 3, 4 show a first embodiment of a fuel assembly according to the invention.
Figure 2:
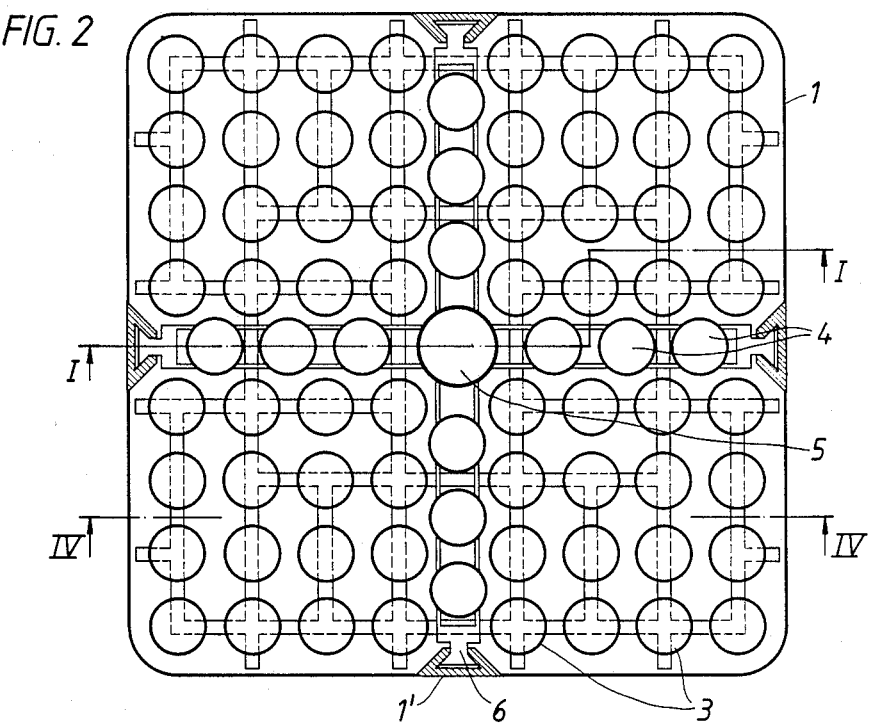
Figure 3:
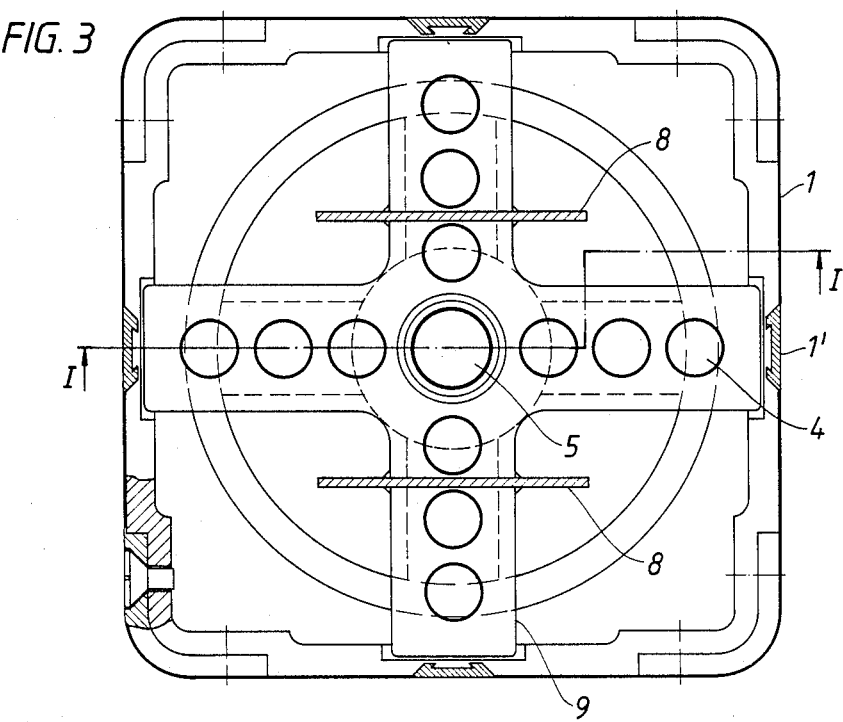
Figure 4:
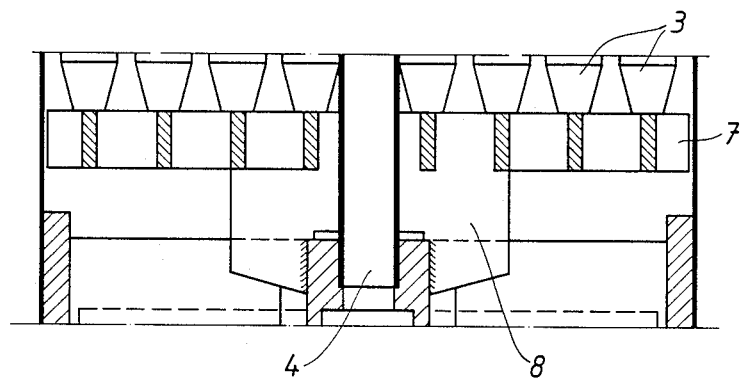

FIG. 1 shows a vertical section along I—I of FIGS. 2 and 3, and FIGS. 2 and 3 show horizontal sections along II—II and III—III, respectively, in FIG. 1. FIG. 4 shows a partial vertical section along IV—IV of FIG. 2.

In FIGS. 1, 2, 3, 4, the numeral 1 designates a fuel box which is attached to a base or transition sleeve 2. The fuel box 1, which is composed of four mutually equal sheet-metal elements joined by means of four vertical strips 1', surrounds sixty-four fuel rods 3, twelve smaller water tubes 4 and a larger, central water tube 5. Each water tube forms one vertical channel, extending along the fuel rods, for a water flow running along the fuel rods but being separated therefrom. The water tubes are mechanically connected to each other by means of a plurality of elongated linking members 6, which are attached with their ends to the strips 1'. The fuel rods 3 rest with their lower ends on a bottom lattice 7, which rests on two vertical supporting plates 8, which are welded to a hollow, cruciform water distributing member 9 provided with connection openings for the water tubes 4 and 5. The connection openings are constructed with annular supporting surfaces, against which the water tubes 4 and 5 rest at their lower end surfaces. The water distributing member 9 is provided with a downwardly-facing, inwardly-conical inlet nozzle 9', which is supported by a cup 10, which is fixedly connected to the transition sleeve 2 via four radially extending suction tubes 11, through which the space surrounded by the cup communicates with the space among adjacent fuel assemblies located radially outside the transition sleeve 2. The cup 10 is traversed by a supply tube 12 for water to the water tubes 4 and 5. The supply tube 12, which is attached to the bottom of the cup and passed therethrough in a pressure-tight manner, is arranged with its inlet opening below a substantially annular end surface 13 of transition sleeve 2. A guide member 14, which consists of a ring 14" and a plurality of rods 14' attached to said ring, is arranged below the orifice of the base 2, the upper ends of the rods being welded to a downwardly-facing annular end surface 13 of the base 2. The fuel assembly shown is intended to be supported, together with three similar fuel assemblies, by a common supporting plate 15 intended for four fuel assemblies, said supporting plate 15 being constructed with a conical supporting surface 15′ and a circular throttling opening 16 for each fuel assembly. As is usual in conventional fuel assemblies, the fuel assembly shown is intended to be arranged with its lowest point at a vertical distance of at the most 20 mm, preferably less than 10 mm, from the throttling opening 16.

The nozzle 9′, the cup 10, the radial tubes 11 and the supply tube 12 together form a water jet pump, and the flow supplied to the water distributing member 9 is the sum of the flows flowing through the tubes 11 and through the supply tube 12. With the design shown, a considerable portion, at least one-fourth, of the water flow flowing through the water tubes 4 and 5 is allowed to be supplied through the suction tubes 11.

It is important that the flow passing through the water tubes 4 and 5 have a suitable magnitude at full reactor power. Also, the flow through tubes 4 and 5 must vary with the circulating cooling flow in such a way that flow through tubes 4 and 5 is sufficiently large when the circulating cooling flow and the reactor power are being reduced, for example to 35% of full circulating cooling flow, so that no boiling or only insignificant boiling takes place in the water tubes 4 and 5. Calculations have shown that the flow passing through the water tubes 4 and 5 will be reduced to a relatively small extent upon decreasing pump speed and will be maintained at the necessary value upon maximum reduction of reactor power, provided the supply tube 12 is constructed and arranged appropriately. Particularly, inlet opening 12′ must be located sufficiently low in relation to throttling opening 16 or in other words, sufficiently low in relation to the lowest point of the fuel assembly other than the inlet opening itself. The inner diameter of the end surface 13 is designated D. The supply tube 12 is arranged with its inlet opening 12′ below a horizontal plane, whose axial spacing L above the lowest point of the fuel assembly, is equal to D. Preferably, the tube opening 12′ is also positioned below a horizontal plane whose axial spacing above the lowest point of the fuel assembly is equal to 0.6 D. Inlet opening 12′ may also be located below the lowest point of the fuel assembly other than the inlet opening.

As shown in FIGS. 1 to 3, the water tubes 4 and 5 constitute a first internal bypass system or means for conducting water along the greater part of the length of the fuel rods 1 without the water's contacting the rods. Similarly, the suction tubes 11, supply tube 12, nozzle 9′ and distributing member 9 constitute a second means positioned below bottom lattice 7 and connected in series with the first means, for conducting water to water tubes 4 and 5. As also shown in these Figures, the minimum flow area of the water tubes 4 and 5 is substantially larger than the minimum flow areas of the supply tube 12 and the four suction tubes 11. As a result, the second water conducting means functions to throttle or restrict flow of water to the first water conducting means. As mentioned previously in the Discussion of Prior Art section of the specification, a fuel assembly configured in this manner provides a sufficient bypass flow at greatly reduced reactor power without giving too great a bypass flow at full power.

Figure 6:
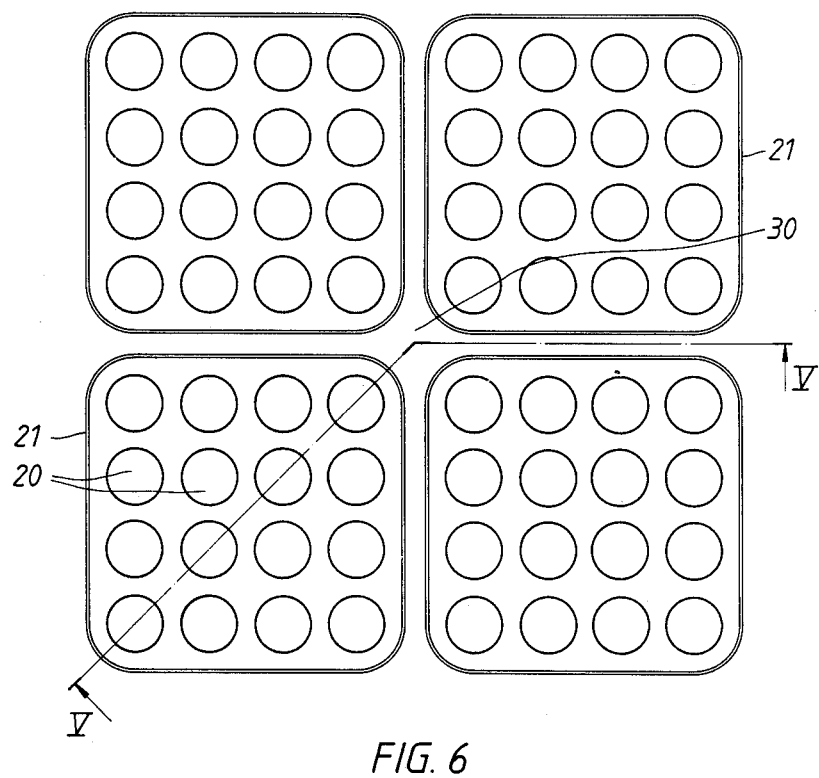
FIGS. 5, 6, 7, 8 show a second.
Figure 5:
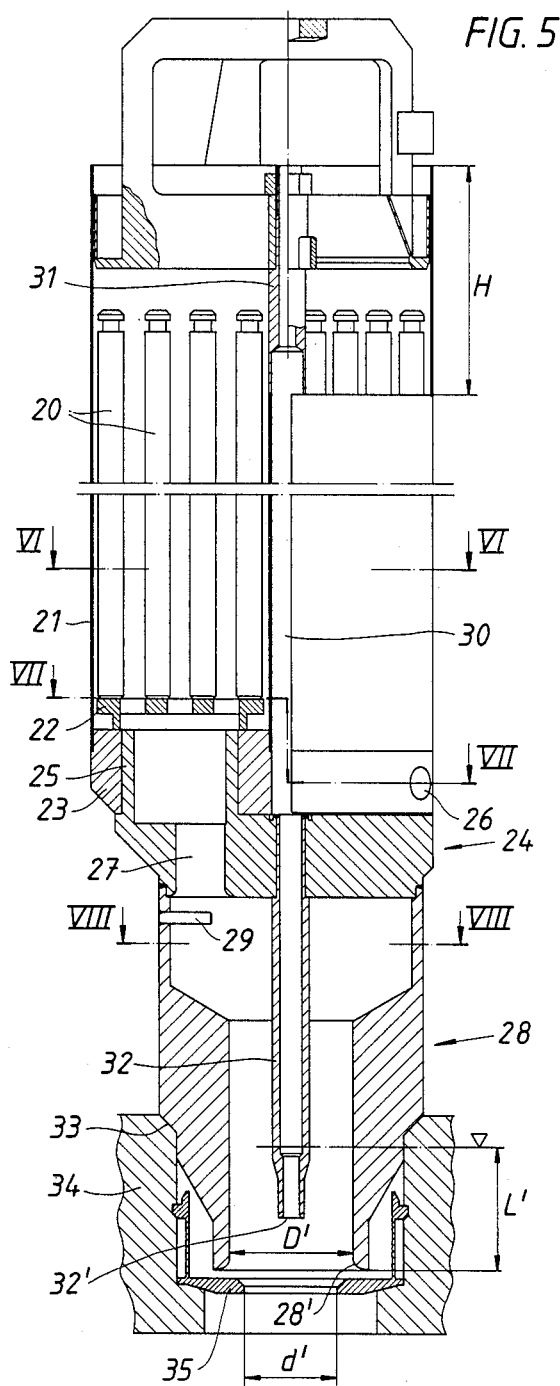
Figure 7:
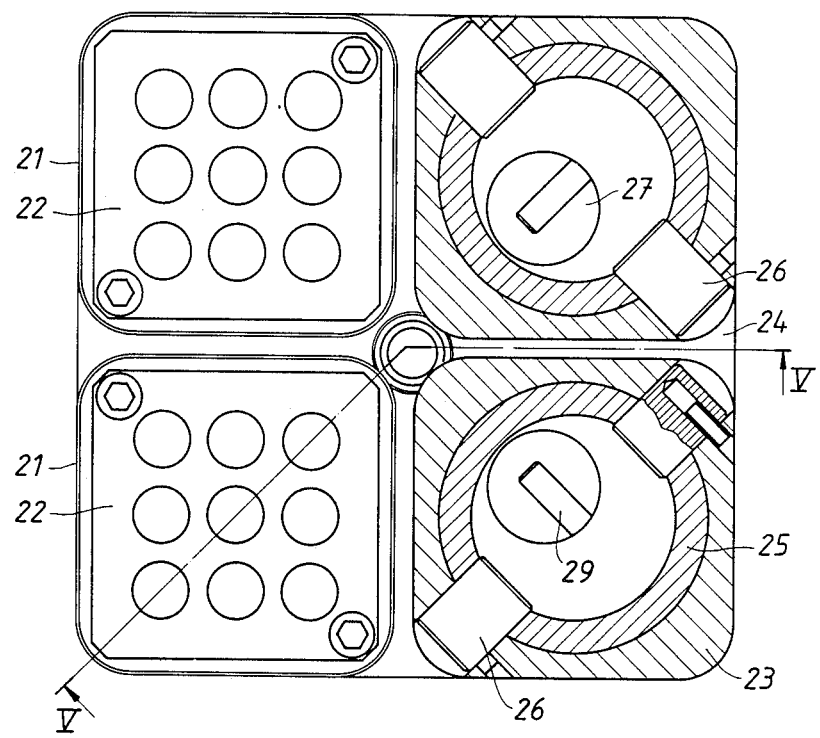
Figure 8:
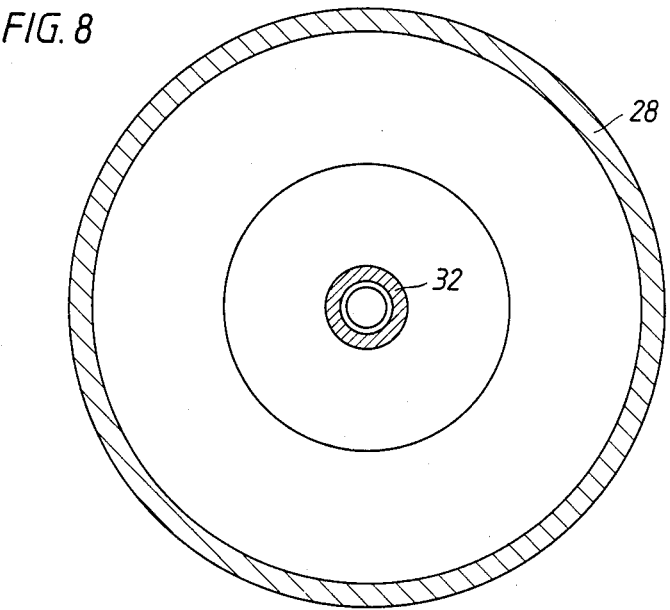

Concerning the embodiment of FIGS. 5, 6, 7, 8, FIG. 5 shows a view taken on vertical section V—V in FIGS. 6 and 7; whereas, FIGS. 6, 7 and 8 show cross-sections along VI—VI, VII—VII and VIII—VIII on FIG. 5. The fuel assembly comprises sixty-four fuel rods 20, which are distributed among four equal groups. The groups are each surrounded by a tubular substantially square fuel box 21 and each provided with a bottom plate. Each fuel box 21 is furnished with a plurality of spacers (not shown on the drawings) and one bottom lattice or plate 22, which supports the fuel rods of the group. Each of the bottom plates 22 rests on a bottom frame 23, welded to a corresponding fuel box 21, which bottom frame is constructed with a circular-cylindrical inner surface. The four bottom frames 23 are supported by distributing block 24, which is formed with four hollow-cylindrical outlet nozzles 25, each of the four bottom frames 23 then surrounding one outlet nozzle 25 without any mentionable play and being attached to the outlet nozzles 25 by means of radially directed pins 26. The outlet nozzles 25 are hydraulically connected, via individual throttling channels 27, to a base 28 welded to the distributing block 24. Four blocking rods 29 are attached to the base below corresponding throttling channels 27 for the purpose of preventing blocking of these if the cooling water should contain any object having become loose.

External wall surfaces of the fuel boxes 21 define a vertical water channel 30 of cruciform cross-section, each channel arm then to a greater or smaller extent being open in a radial direction. The four fuel boxes 21, which each surround a corresponding bundle of fuel rods, are connected, at their upper ends and above the active fuel rod portions, to an upper fuel box portion, made with a vertical extension H, which surrounds all the fuel rods of the fuel assembly. An upper portion of each fuel box 21 is mechanically connected to a central top tube 31.

The vertical channel 30 is hydraulically connected at its lower portion to a supply tube 32 which extends at its upper end through the distributing block 24. The base 28 is made with a conical bearing surface 33, which is intended to make contact with a corresponding surface of a throughflow opening formed in a supporting plate 34. The through-flow opening is provided with a throttling plate 35 with a circular throttling opening, the diameter of which is d′. At its lowermost portion the base 28 has a circular, annular end surface 28′. The diameter at the inner edge of the end surface 28′ is designated D′.

The inlet opening 32′ of the supply tube 32 is located below a level whose axial spacing above the outer edge of the annular end surface 28′ is designated L′, where L′=D′. Preferably, the inlet opening 32′ is located below a horizontal plane whose axial spacing above end surface 28′ height is equal to 0.6 D′. The inlet opening 32′ can also be located below the throttling plate 35.

As shown in FIGS. 5 to 7, the cruciform vertical water channel 30 among the fuel boxes 21 constitutes a first bypass system or means for conducting water along the greater part of the length of the fuel rods 20 without the water's contacting the rods. Similarly, the supply tube 32 constitutes a second means, positioned below bottom lattice 22 and connected in series with the first means, for conducting water to channel 30. As also shown in these Figures, the minimum flow area of channel 30 is substantially larger than the minimum flow area of supply tube 32. As a result, the second water conducting means functions to throttle or restrict flow of water to the first water conducting means. This arrangement, as in the embodiment of FIGS. 1 to 3, provides a sufficient bypass flow at greatly reduced reactor power without giving too great a bypass flow at full power.

Figure 9:
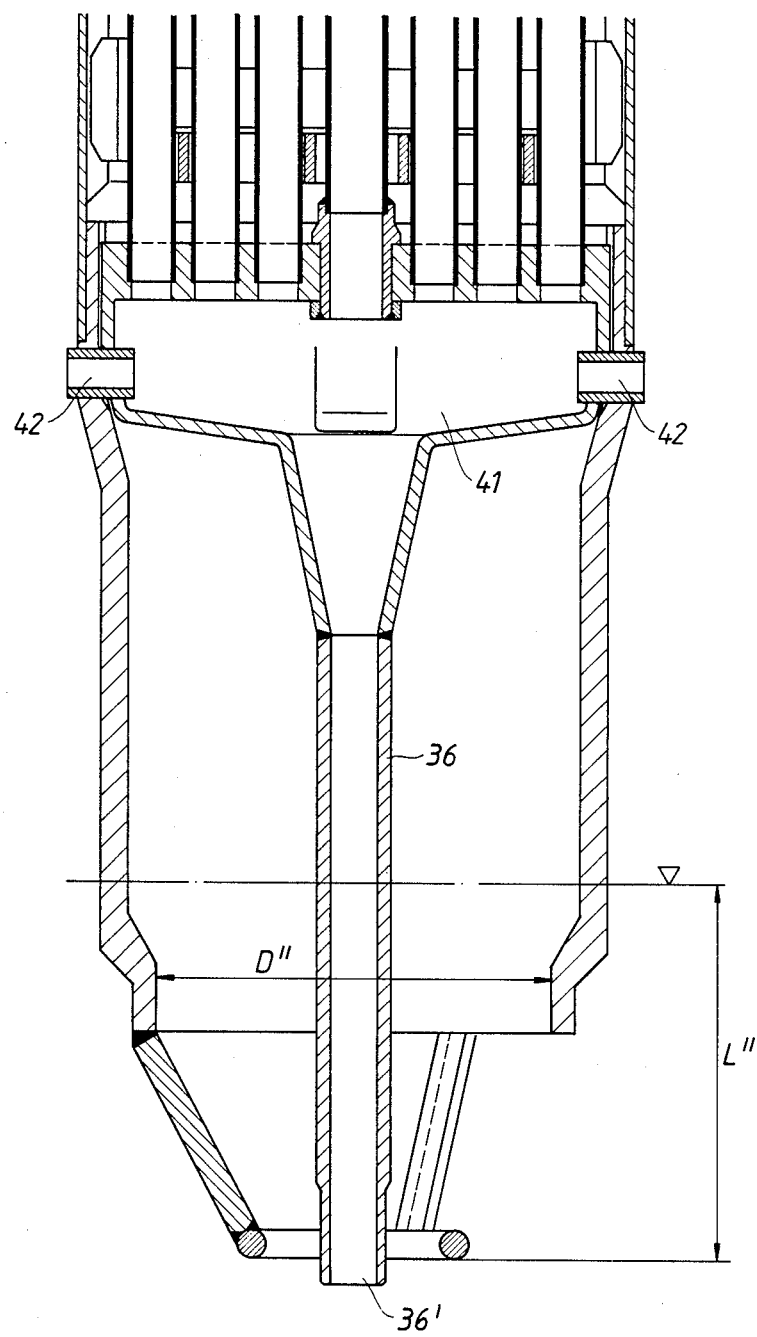
FIG. 9, a third.

The embodiment shown in FIG. 9 differs from those shown in FIGS. 1, 2, 3 and 4 by the absence of the ejector pump device and by the substitution therefore of an inlet tube 36, which is mechanically and hydraulically connected to a cruciform water distributing member 41 of a similar design as the member 9 shown in FIG. 1. The portion of the fuel assembly located above the member 41 is exactly equal to the corresponding portion of the embodiment shown in FIGS. 1, 2, 3 and 4. The cavity surrounded by the member 41 is arranged, via at least one hydraulic connector means or branch connection, such as a radial tube 42, in hydraulic connection with the space located outside the fuel assembly. The inlet opening 36' of the inlet tube 36 is located at a considerably lower level than the opening 12' shown in FIG. 1. However, the desired effect could be achieved to approximately the same extent with another level, for example at the inlet opening 36' at the same relative height as the opening 12' in FIG. 1. The inlet opening of the supply tube must under all circumstances be located at a lower level than a level whose height L" above the lowermost point of any other part of the fuel assembly is equal to the diameter D".

As shown in FIGS. 1 to 3 and 9, the water tubes 4 and 5 constitute a first internal bypass system or means for conducting water along the greater part of the length of the fuel rods 1 without the water's contacting the rods. Similarly, the inlet tube 36, distributing member 41 and radial tubes 42 constitute a second means, positioned below bottom lattice 7 and connected in series with the first means, for conducting water to water tubes 4 and 5. As also shown in the Figures, the minimum flow area of water tubes 4 and 5 is substantially larger than the minimum flow area of inlet tube 36 and radial tubes 42. As a result, the second water conducting means functions to throttle or restrict flow of water to the first water conducting means. This arrangement, as in the embodiments of FIGS. 1 to 3 and 5 to 7, provides a sufficient bypass flow at greatly reduced reactor power without giving too great a bypass flow at full power.

Figure 10:
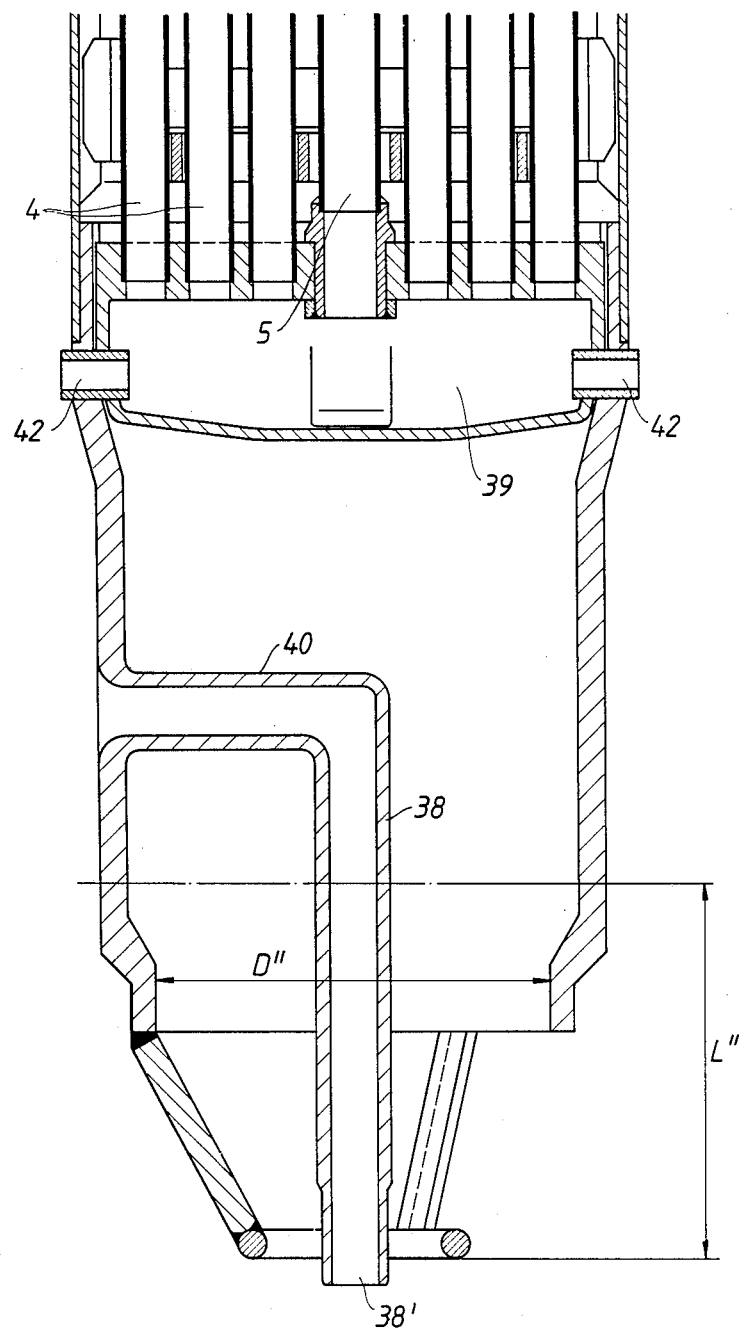
FIG. 10, a fourth embodiment, the latter two being seen in partial axial section.

The fuel assembly shown in FIG. 10 differs from the one shown in FIG. 9 only with respect to the water distributing member 39 and the supply tube 38. The member 39 has no downwardly-directed inlet nozzle, and the upper end of the supply tube 38 is only connected to the space located radially outside the base, namely, via at least one horizontal tube portion 40 which passes through the wall of the base at a level below radial tubes 42. The volume of water flowing through the inlet opening 38' of the supply tube is supplied to the vertical water tubes 4 and 5 of the fuel assembly indirectly via the gaps between the fuel assemblies from which this volume of water flows into the water distributing member 39 through branch connections such as the radial tubes 42.

As shown in FIGS. 1 to 3 and 10, the water tubes 4 and 5 constitute a first internal bypass system or means for conducting water along the greater part of the length of the fuel rods 1 without the water's contacting the rods. Similarly, the supply tube 38, distributing member 39, tube portion 40 and radial tubes 42 constitute a second means, positioned below bottom lattice 7 and connected in series with the first means, for conducting water to water tubes 4 and 5. As also shown in the Figures, the minimum flow area of water tubes 4 and 5 is substantially larger than the minimum flow area of supply tube 38 and radial tubes 42. As a result, the second water conducting means functions to throttle or restrict flow of water to the first water conducting means. This arrangement, as in the embodiments of FIGS. 1 to 3, 5 to 7 and 9, provides a sufficient bypass flow at greatly reduced reactor power without giving too great a bypass flow at full power.

With the fuel assemblies shown in FIGS. 9 and 10, boiling in the water channels 4 and 5 is accepted to a certain extent. This boiling is utilized as a means of producing self-circulation so that water is sucked in through the radial tubes 42. In the embodiment of FIG. 9, the flows of water through radial tubes 42 and inlet tube 36 enter the cavity of distributing member 41 simultaneously. A very low, fully acceptable boiling activity is sufficient.

We claim:

1. In a fuel assembly for a boiling water reactor, said assembly being of the type having a vertical center line and being configured for control by control rods external to said assembly, said fuel assembly including a lower lattice element; a plurality of fuel rods supported by said lattice element; at least one fuel box surrounding a corresponding group of said fuel rods; a sleeve-like base supporting said lattice element and said at least one fuel box, said base having a downwardly directed first inlet opening for supplying a coolant flow to the surfaces of said fuel rods and a downwardly facing, annular end surface having an inner diameter defining said first inlet opening; and a bypass means supported by said assembly for conducting a by-pass flow of water along said fuel rods, the improvement wherein said bypass means comprises:

first means for conducting water along the greater part of the length of said fuel rods without the water's contacting said fuel rods while the water is conducted therealong, said first means having a first minimum flow area; and second means, positioned below said lattice element and connected in series with said first means, for conducting a portion of said flow to said first means, said second means having a second minimum flow area and a second inlet opening, said second inlet opening being positioned below a horizontal plane, said horizontal plane being located at a distance above the lowermost point of the fuel assembly, said distance being equal to said inner diameter of said first inlet opening, said first minimum flow area being greater than said second minimum flow area such that said second means constitutes a flow restriction for said bypass flow.

2. The improvement according to claim 1, wherein said second means comprises an upwardly directed supply tube, an ejector pump positioned within said sleeve-like base and connected to receive water from said supply tube, at least one suction tube extending from the exterior of said sleeve-like base to deliver water to said ejector pump, an outlet nozzle connected to said ejector pump to deliver water therefrom, and means connected to said outlet nozzle for distributing water to said first means for conducting water along said fuel rods.

3. The improvement according to claim 1, wherein there are a plurality of said fuel boxes supported by said base, said fuel boxes being spaced from each other to define a water channel thereamong; and said second means comprises an upwardly directed supply tube having an upper end opening into said water channel.

4. The improvement according to claim 1, wherein said second means comprises an upwardly directed supply tube having an upper end, third means connected to said upper end for distributing water to said first means, said third means defining an interior cavity hydraulically communicating with said first means, and hydraulic connector means, extending from said cavity to the exterior of said fuel assembly, for introducing a flow of water into said cavity simultaneously with the flow from said supply tube.

5. The improvement according to claim 4, wherein said first means comprises a plurality of vertical water tubes arranged in two rows which intersect at said center line, the lower ends of said water tubes being supported by said third means and opening into said interior cavity; said third means comprises a cruciform hollow body defining said cavity, said cruciform hollow body being supported by said sleevelike base and having a central inlet opening connected to said supply tube; and said hydraulic connector means comprises tubes extending from said cavity out of said cruciform hollow body to the exterior of said fuel assembly.

6. The improvement according to claim 1, wherein said second means comprises a supply tube arranged to conduct water upwardly from said inlet opening and laterally through the side wall of said sleeve-like base; third means, defining an interior cavity hydraulically communicating with said first means, for distributing water to said first means; and hydraulic connector means extending from said cavity to the exterior of said fuel assembly, for introducing a flow of water into said cavity in response to flow through said supply tube.

7. The improvement according to claim 6, wherein said hydraulic connector means comprises tubes extending from said cavity to the exterior of said fuel assembly.

8. The improvement according to claim 1, wherein said flow restriction provides a magnitude of said bypass flow for optimum distribution of said water conducted by said first means at full reactor power, and a magnitude of said bypass flow sufficient to prevent significant boiling of said water conducted by said first means upon maximum reduction of said full reactor power.

9. The improvement according to claim 1, wherein said coolant flow comprises a throttled stream of water, and said second inlet opening is below a level at which said throttled stream of water acquires an increased crosssection with only vertical streamlines.

10. The improvement according to claim 1, wherein a water throttling means is provided below said first inlet opening, and wherein said fuel assembly is arranged with its lowermost point at a vertical distance above said throttling opening of at the most substantially 20 mm.

11. The improvement according to claim 10, wherein said vertical distance is less than 10 mm.

12. The improvement of claim 2, wherein at least substantially one-fourth of the water conducted by said first means is delivered to said ejector pump by said at least one suction tube.

13. In a fuel assembly for a boiling water reactor, said assembly being of the type having a vertical center line and being configured for control by control rods external to said assembly, said fuel assembly including a lower lattice element; a plurality of fuel rods supported by said lattice element; at least one fuel box surrounding a corresponding group of said fuel rods; a sleeve-like base supporting said lattice element and said at least one fuel box, said base having a downwardly directed first inlet opening for supplying a coolant flow to the surfaces of said fuel rods and a downwardly facing, annular end surface having an inner diameter defining said first inlet opening, said coolant flow first passing through a throttling opening below said first inlet opening to provide a throttled stream of water; and a bypass means supported by said assembly for conducting a by-pass flow of water along said fuel rods, the improvement wherein said bypass means comprises:
first means for conducting water along the greater part of the length of said fuel rods without the water's contacting said fuel rods while the water is conducted therealong, said first means having a first minimum flow area; and
second means, positioned below said lattice element and connected in series with said first means, for conducting a portion of said flow to said first means, said second means having a second minimum flow area and a second inlet opening, said sleeve-like base causing said throttled stream to acquire at a level above said first inlet opening an increased cross-section with only vertical stream lines and said second inlet opening being positioned below said level, said first minimum flow area being greater than said second minimum flow area such that said second means constitutes a flow restriction for said bypass flow.

14. The improvement according to claim 13, wherein said second inlet opening is below a horizontal plane located at a distance above said throttling opening equal to said inner diameter of said first inlet opening plus not more than 20 mm.

15. The improvement according to claim 13, wherein said second inlet opening is below a horizontal plane located at a distance above said throttling opening equal to said inner diameter of said first inlet opening plus less than 10 mm.

* * * * *